United States Patent
Bender et al.

(10) Patent No.: US 11,151,215 B2
(45) Date of Patent: *Oct. 19, 2021

(54) IDENTIFYING WEBPAGES ACCESSIBLE BY UNAUTHORIZED USERS VIA URL GUESSING OR NETWORK SNIFFING

(71) Applicant: INTERNATIONAL BUSINESS MACHINES CORPORATION, Armonk, NY (US)

(72) Inventors: Michael Bender, Rye Brook, NY (US); David E. Nachman, Morristown, NJ (US); Michael P. Shute, Niantic, CT (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,436

(22) Filed: Sep. 24, 2019

(65) Prior Publication Data
US 2020/0019582 A1 Jan. 16, 2020

Related U.S. Application Data

(63) Continuation of application No. 15/995,823, filed on Jun. 1, 2018, now Pat. No. 10,460,002, which is a
(Continued)

(51) Int. Cl.
*H04L 9/00* (2006.01)
*G06F 16/955* (2019.01)
(Continued)

(52) U.S. Cl.
CPC .......... *G06F 16/9566* (2019.01); *G06F 16/84* (2019.01); *H04L 63/0236* (2013.01);
(Continued)

(58) Field of Classification Search
CPC . G06F 16/9566; G06F 16/84; H04L 63/0236; H04L 63/101; H04L 67/02; H04L 63/168
(Continued)

(56) References Cited

U.S. PATENT DOCUMENTS 5,935,210 A * 8/1999 Stark ............... G06F 16/958
709/224
6,547,829 B1 * 4/2003 Meyerzon ......... G06F 16/951
715/234

(Continued)

FOREIGN PATENT DOCUMENTS

EP 2860935 A1 4/2015

OTHER PUBLICATIONS

List of IBM Patents or Patent Applications Treated as Related dated Sep. 24, 2019, 1 page.

*Primary Examiner* — Christopher J Brown
(74) *Attorney, Agent, or Firm* — William Hartwell; Andrew D. Wright; Roberts Calderon Safran & Cole, P.C.

(57) ABSTRACT

A computer-implemented method includes: generating a first list of uniform resource locators (URLs) available on a page when accessed using privileged credentials; storing one or more first URL outputs associated with the first list of URLs including the content of webpages accessed using the privileged credentials; generating a second list of URLs when accessed using non-privileged credentials; generating a third list of URLs, wherein the third list of URLs includes URLs included in the first list of URLs and not included in the second list of URLs; storing a second URL output including content of a webpage mapped to a particular URL in the third list of URLs when the particular URL is accessed using the non-privileged credentials; determining that the second URL output matches a particular first URL output associated with the particular URL; and outputting an alert
(Continued)

identifying that the webpage is accessible by an unauthorized user.

22 Claims, 8 Drawing Sheets

Related U.S. Application Data continuation of application No. 14/945,487, filed on Nov. 19, 2015, now Pat. No. 10,019,529.

(51) Int. Cl.
*H04L 29/08* (2006.01)
*H04L 29/06* (2006.01)
*G06F 16/84* (2019.01)

(52) U.S. Cl.
CPC ............ *H04L 63/101* (2013.01); *H04L 67/02* (2013.01); *H04L 63/168* (2013.01)

(58) Field of Classification Search
USPC .............................................................. 726/4
See application file for complete search history.

(56) References Cited

U.S. PATENT DOCUMENTS

| | | | |
|---|---|---|---|
| 7,735,122 B1 * | 6/2010 | Johnson | H04L 67/02 |
| | | | 726/6 |
| 8,533,328 B2 | 9/2013 | Jeon | |
| 8,850,567 B1 | 9/2014 | Hsieh et al. | |
| 8,910,292 B1 | 12/2014 | Oliphant et al. | |
| 8,949,990 B1 | 2/2015 | Hsieh et al. | |
| 10,019,529 B2 | 7/2018 | Bender et al. | |
| 2009/0119776 A1 * | 5/2009 | Palnitkar | G06Q 20/40 |
| | | | 726/25 |
| 2015/0081689 A1 | 3/2015 | Marshall | |
| 2015/0106939 A1 | 4/2015 | Lietz et al. | |
| 2016/0164904 A1 * | 6/2016 | Alamuri | H04L 63/105 |
| | | | 726/25 |
| 2017/0149782 A1 | 5/2017 | Bender | |
| 2018/0276307 A1 | 9/2018 | Bender et al. | |

\* cited by examiner

IDENTIFYING WEBPAGES ACCESSIBLE BY UNAUTHORIZED USERS VIA URL GUESSING OR NETWORK SNIFFING

BACKGROUND

The present invention generally relates to securing webpages, and more particularly, to preventing unauthorized users from accessing webpages via Uniform Resource Locator (URL) guessing/network sniffing.

Webpages and web applications may be at risk when underlying pages are accessible by unauthorized users. For example, a web application may provide access to confidential webpages or content intended to be accessible only by authorized users via privileged credentials (e.g., user ID and password of an authorized user). In some situations, these confidential webpages can be accessed using non-privileged credentials or via a session associated with non-privileged credentials. For example, URLs for webpages having confidential content may be guessed, sniffed over a network, obtained via screen shots, or obtained via other documentation.

As an example, a user may use their private credentials to access a root page that contains a URL to another webpage containing private employee information. URL guessing may reveal that changing a single parameter in the URL with a known identifier (e.g., an employee serial number), would direct the user to private information about other employees. This type of exposure could result in a data privacy violation.

In another example, a user of a popular fantasy sports web site may discover that by supplying a direct URL of the third page in a three page team transaction sequence, with substitution of a known ID in the URL, the user could see the hidden team of any other user they desired prior to match day when teams are locked and revealed. This exposure could lead to an unfair advantage for users with this knowledge, loss of reputation for the site operator, and potentially loss of revenue for the site operator. The consequences are far more severe when this type of exposure is present in banking, investment, e-commerce, health, and other highly sensitive sites. Current web vulnerability scan applications lack a mechanism to detect such exposure. Therefore, a solution is needed to detect webpage or web application exposure and alert webpage operators.

SUMMARY

In an aspect of the invention, a computer-implemented method includes: generating, by a computing device, a first list of uniform resource locators (URLs) available on a root page when accessing the root page using privileged credentials; accessing, by the computing device using the privileged credentials, respective webpages mapped to each URL in the first list of URLs; storing, by the computing device, one or more first URL outputs, wherein each of the one or more first URL outputs includes content of the respective webpages accessed using the privileged credentials; generating, by the computing device, a second list of URLs available on the root page when accessing the root page using non-privileged credentials; generating, by the computing device, a third list of URLs based on the first list of URLs and the second list of URLs, wherein the third list of URLs includes URLs included in the first list of URLs and not included in the second list of URLs; accessing, by the computing device using the non-privileged credentials, a webpage mapped to a particular URL in the third list of URLs; storing, by the computing device, a second URL output including the content of the webpage mapped to a particular URL in the third list of URLs when the particular URL is accessed using the non-privileged credentials; determining, by the computing device, that the second URL output matches a particular first URL output, of the one or more first URL outputs, associated with the particular URL; and outputting, by the computing device, an alert identifying that the webpage, mapped to the particular URL, is accessible by an unauthorized user based on determining that the second URL output matches the particular first URL output.

In embodiments, generating the third list of URLs list includes generating the third list of URLs by comparing the URLs in first list of URLs with the URLs in the second list of URLs and eliminating the URLs in the first list of URLs that are in the second list of URLs. In embodiments, the alert includes a report identifying a plurality of webpages accessible by unauthorized users. In embodiments, accessing the root page with the privileged credentials or the non-privileged credentials includes submitting the privileged credentials or non-privileged credentials in a form on a login page associated with the root page.

In an aspect of the invention, there is computer program comprising a computer readable storage medium having program instructions embodied therewith. The program instructions are executable by a computing device to cause the computing device to: receive a list of privileged uniform resource locators (URLs); access a webpage mapped to a particular URL in the list of privileged URLs using privileged credentials; store a first URL output including the content of the webpage accessed using the privileged credentials; access a webpage mapped to the particular URL in the list of privileged URLs using non-privileged credentials; store a second URL output including the content of the webpage accessed using the non-privileged credentials; determine that the second URL output matches the first URL output; and output an alert identifying that the webpage, mapped to the particular URL, is accessible by an unauthorized user based on determining that the second URL output matches the first URL output.

In embodiments, the URLs in the list of privileged URLs are mapped to webpages having confidential content associated with an authorized user. In embodiments, the program instructions cause the computing device to compare the first URL output with the second URL output.

In an aspect of the invention, a system includes: a CPU, a computer readable memory and a computer readable storage medium associated with a computing device; program instructions to access a root page associated with a particular application or website using privileged credentials; program instructions to generate a first list of uniform resource locators (URLs) available on the root page when accessing the root page using the privileged credentials; program instructions to access the root page using non-privileged credentials; program instructions to generate a second list of URLs available on the root page when accessing the root page using the non-privileged credentials; program instructions to generate a third list of URLs based on the first list of URLs and the second list of URLs, wherein the third list of URLs includes URLs included in the first list of URLs and not included in the second list of URLs; program instructions to access a webpage mapped to a particular URL in the third list of URLs using the privileged credentials; program instructions to store a first URL output including the content of the webpage accessed using the privileged credentials; program instructions to access a webpage mapped to the particular URL in the third list of URLs using the non-privileged credentials; program instructions to store a second URL output including the content of the webpage accessed using the non-privileged credentials; determine that the second URL output matches a first URL output associated with the particular URL; and program instructions to output an alert identifying that the webpage, mapped to the particular URL, is accessible by an unauthorized user based on determining that the second URL output matches a first URL output associated with the particular URL. The program instructions are stored on the computer readable storage medium for execution by the CPU via the computer readable memory.

In embodiments, the URLs in the third list of URLs are mapped to webpages having confidential content associated with an authorized user. In embodiments, the privileged credentials are different than the non-privileged credentials.

In an aspect of the invention, a computer-implemented method includes: storing, by a computing device, a first URL output including content of a webpage when a URL of the webpage is accessed using privileged credentials; storing, by a computing device, a second URL output including content of the webpage when the URL is accessed using non-privileged credentials; determining, by the computing device, that the second URL output matches the first URL output; and outputting, by the computing device, an alert identifying that a webpage, mapped to the URL, is accessible by an unauthorized user based on determining that the second URL output matches a first URL output.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to securing webpages, and more particularly, to preventing unauthorized users from accessing webpages via Uniform Resource Locator (URL) guessing/network sniffing. As described herein, an application server hosts or implements a web-based application or website. The application server provides access to the web-based application or website via user credentials. The application server may present different root pages to different users based on the received user credentials. Different root pages associated with different users may present URLs to different pages based on the pages that different users are permitted to access. URLs mapped to confidential pages can sometimes be determined via guessing and/or network sniffing techniques.

Aspects of the present invention may include a system, method, and program that crawl through a root page hosted by an application server to determine whether unauthorized users are able to access URLs presented on the root page that are intended to be accessible only by authorized users (e.g., if an unauthorized user attempts to access a URL by entering the URL in a web browser). Advantageously, URLs that are accessible by unauthorized users are identified so that security measures can be put in place to prevent these URLs from being accessed using non-privileged credentials. For example, in embodiments, site operators may implement additional firewalls, security checks, redirect mechanisms, or other techniques to prevent confidential webpages from being accessed by unauthorized users.

In embodiments, the present invention may include an application security server to access a root page associated with a particular application or website (e.g., hosted by an application server) using privileged credentials (e.g., by submitting forms that include the privileged credentials). The application security server may be configured to produce a first list of URLs presented within the root page (e.g., a list of URLs intended to be accessible to the user associated with the privileged credentials). The application security server may then "crawl" or access each of the URLs using the privileged credentials and store images of the pages access via the URLs. The application security server may then access the root page associated with the same application or website using non-privileged credentials (e.g., guest credentials, credentials of a different user, etc.), and produce a second list of URLs presented within the root page accessed by the non-privileged credentials (e.g., a list of URLs permitted to be accessible by the user of the non-privileged credentials). In embodiments, the application security server compares the two lists of URLs and generates a list of "privileged" URLs (e.g., URLs that are in the first list, but not in the second list). The list of privileged URLs identifies those URLs that should not be accessible to unauthorized users (e.g., users that attempt to access the URLs using a non-privileged ID).

In embodiments, the list of privileged URLs is processed by accessing the privileged URLs using a non-privileged ID. For example, the application security server may establish a non-privileged session using non-privileged credentials, and request webpages via the non-privileged session using the list of privileged URLs. Images of the webpages accessed using the non-privileged credentials (e.g., referred to as non-privileged URL outputs) may be stored and compared with the images of the pages accessed using the privileged credentials (e.g., referred to as privileged URL outputs).

In implementations, for a particular URL in the privileged URL list, if the non-privileged URL output matches the privileged URL output, a determination is made that the particular URL is accessible using non-privileged credentials (e.g., via a non-privileged session). The determination of a successful launch of a URL using non-privileged credentials may further be based on querying the resulting page for error messages, applying textual pattern matching checks and page size comparison to determine if the webpage loaded successfully. In the event that a URL is accessible from non-privileged credentials, an alert may be generated and provided to a site operator that hosts the exposed webpage. Advantageously, URLs that are accessible using non-privileged credentials are identified so that security measures can be put in place to prevent these URLs from being accessed using non-privileged credentials. For example, in embodiments, site operators may implement additional firewalls, security checks, redirect mechanisms, or other techniques to prevent confidential webpages from being accessed using non-privileged credentials.

In embodiments, multiple pages from a given root page may be bundled together and provided to a site administrator as a security alert. The above processes may be performed on a schedule, upon web page addition or modification, or on demand to test for web site vulnerabilities. In aspects, the URL lists from privileged and non-privileged root pages may be generated in parallel to minimize noise due to time changes. When executed as part of the development process, the systems and/or methods, described herein, have the capability of crawling through other code from the same development environment, as code exposures in one set of web pages from a development team would increase the possibility of similar exposure in other code from the same team.

In another embodiment, the process may be performed in real-time to detect unauthorized access attempts, even if unsuccessful, in which case security alerts may be sent to a security team for further analysis or the user may be given a warning or other action. In this scenario, potential hackers could be identified when a request for a webpage using a URL in the privileged URL list returns an error or message denying access.

Aspects of the present invention solve the technical problem of determining whether an unauthorized user is able to access confidential content via a URL intended to be accessible only by authorized users. For example, aspects of the present invention provide a technical solution to this problem by storing outputs of webpage requests made using privileged URLs and privileged credentials, storing outputs of webpage requests made using privileged URLs and non-privileged credentials, and comparing the outputs. Further, aspects of the present invention provide a technical solution to improving webpage and web application security by outputting alerts to web application and site administrators identifying security exposures (e.g., private webpages that are accessible to unauthorized users via URLs mapped to the private webpages).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Figure 1:
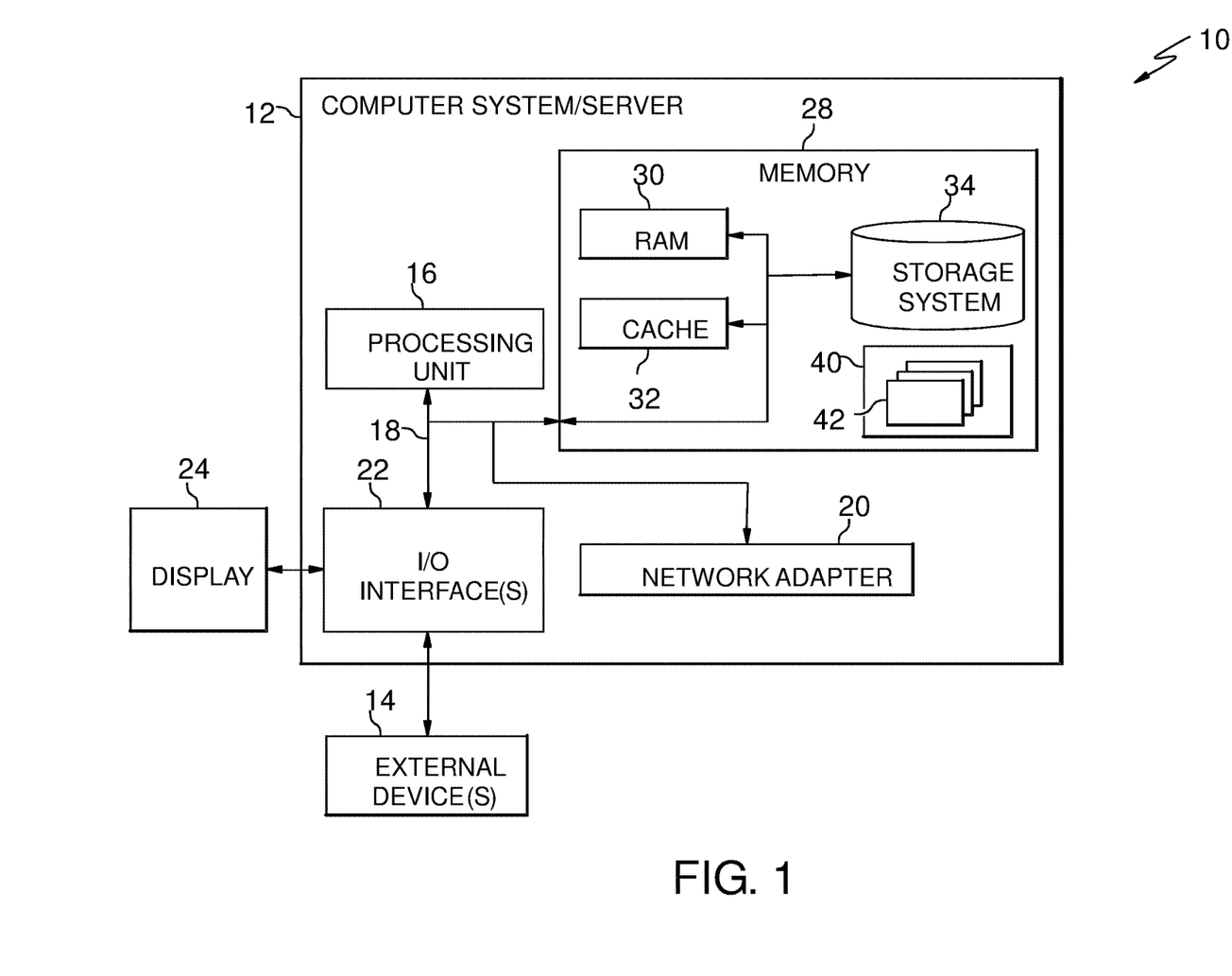
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing infrastructure 10 is shown in the form of a general-purpose computing device. The components of computer system/server 12 may include, but are not limited to, one or more processors or processing units (CPUs) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
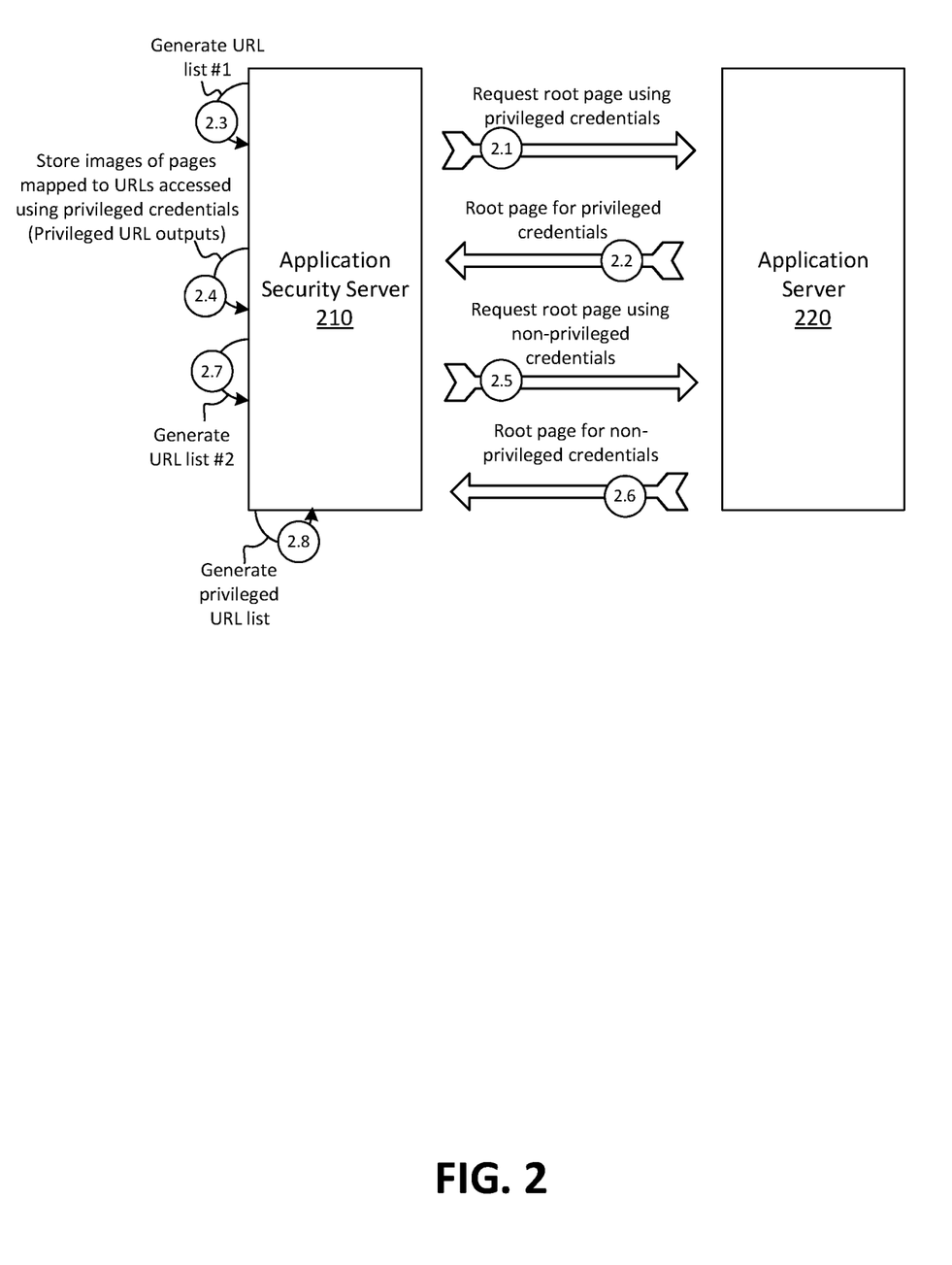
FIGS. 2 and 3 show an overview of an example implementation in accordance with aspects of the present invention.

FIG. 2 shows an overview of an example implementation in accordance with aspects of the present invention. As shown in FIG. 2, an application security server 210 requests, from an application server 220 a root page using privileged credentials associated with a particular user (step 2.1). For example, the application security server 210 may request the root page by entering the privileged credentials in a form at a login screen. Based on receiving the request, the application server 220 may establish a session with the application security server 210, and output the root page for the user associated with the privileged credentials (step 2.2). The application security server 210 may identify a list of URLs presented in the root page and generate first list of URLs (step 2.3). The application security server 210 may "crawl" the URLs by accessing the webpages mapped to these URLs using the privileged credentials (e.g., via the session). Further, at step 2.4, the application security server 210 may store images of the pages mapped to the URLs accessed using the privileged credentials (e.g., privileged URL outputs).

The application security server 210 may request (at step 2.5) a root page using "non-privileged" credentials (e.g., a different set of credentials associated with a different user or a guest user). For example, the application security server 210 may enter the non-privileged credentials at login screen, or select a link for a guest user to access the root page. The application server 220 may receive the request, establish a "non-privileged" session (e.g., a session that is associated with the non-privileged credentials), and provide the root page associated with the user of the non-privileged credentials (step 2.6). The application security server 210 may identify a list of URLs presented in the root page associated with the non-privileged credentials, and generate second list of URLs (step 2.7). The application security server 210 may then generate a "privileged" URL list (step 2.8). For example, the application security server 210 may compare the first URL list and the second URL list, and generate the privileged URL list having the URLs that are present in the first URL list but not in the second URL list. The privileged URL list includes those URLs that should not be accessible by via a non-privileged session (e.g., using non-privileged credentials).

Figure 3:
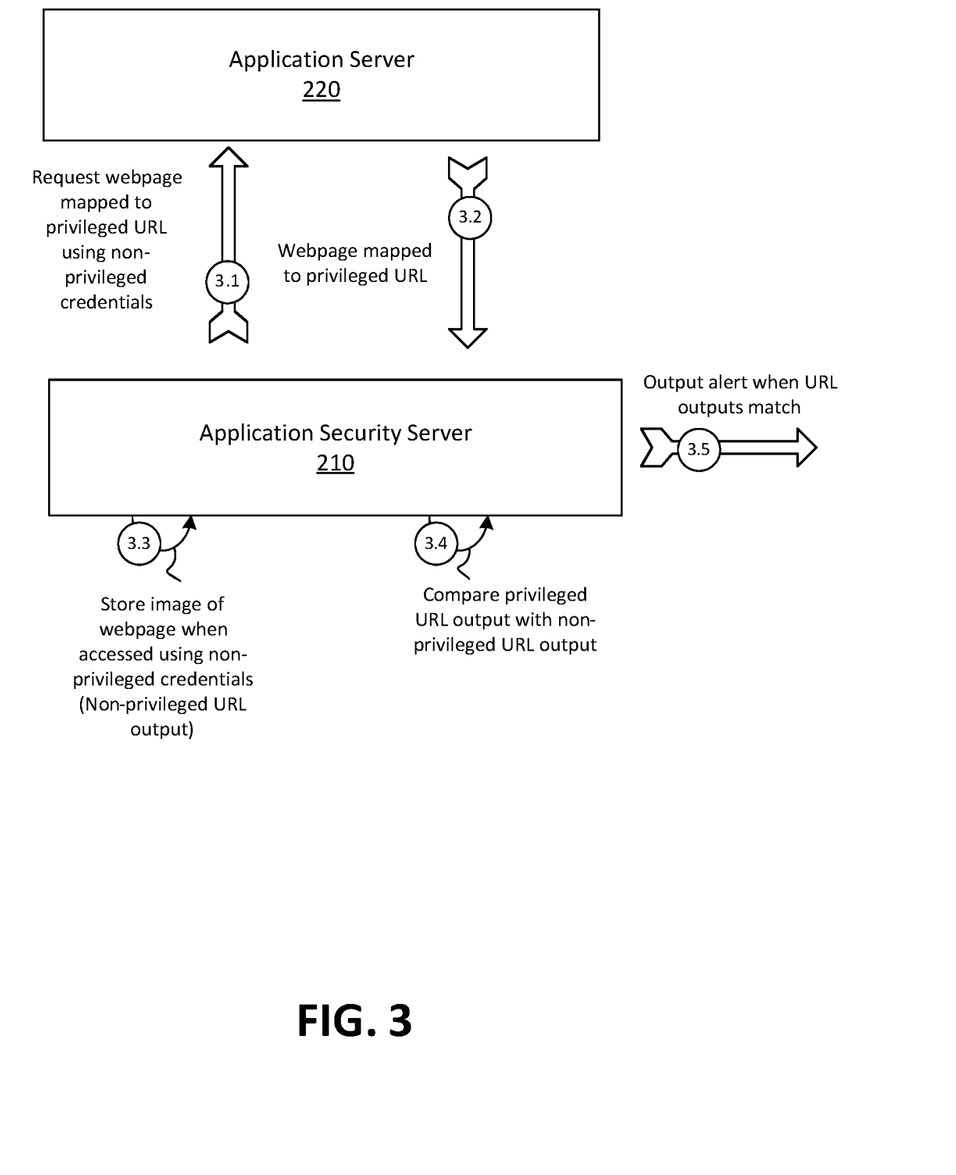

Referring to FIG. 3, at step 3.1, the application security server 210 may request, from the application server 220 using non-privileged credentials, a webpage mapped to a privileged URL (e.g., a URL in the privileged URL list). At step 3.2, the application server 220 may provide the webpage mapped to the privileged URL. At step 3.3, the application security server 210 may store the image of the webpage when the webpage was accessed using non-privileged credentials (e.g., the non-privileged URL output). At step 3.4, the application security server 210 may compare the privileged URL output (generated at step 2.4) with the non-privileged URL output. If the outputs match (e.g., if the application security server 210 is able to access the same webpage having the same content using both privileged and non-privileged credentials), the application security server 210 may output an alert (e.g., to a site administrator associated with the application server 220). If the outputs do not match (e.g., if different content is presented when accessing the privileged URL using privileged and non-privileged credentials), the application security server 210 may determine that the webpage mapped to the privileged URL is secure, and may store or output information indicating as such (at step 3.5). For example, if the privileged URL is accessed using non-privileged credentials, the non-privileged output may include an error message, an indication that the webpage is not authorized, or content from a redirected page, whereas the privileged output would include the actual content viewable to an authorized user.

In alternative embodiments, a privileged URL list may be pre-defined and may not need to be generated by comparing URL lists generated from root pages accesses using different sets of credentials. For example, the application security server 210 may simply attempt to access a privileged URL identified in a pre-defined privileged URL list using non-privileged credentials, and generate an alert if the attempt is successful (e.g., if the output of the URL request using non-privileged credentials matches the output of the URL request using privileged credentials).

Figure 4:
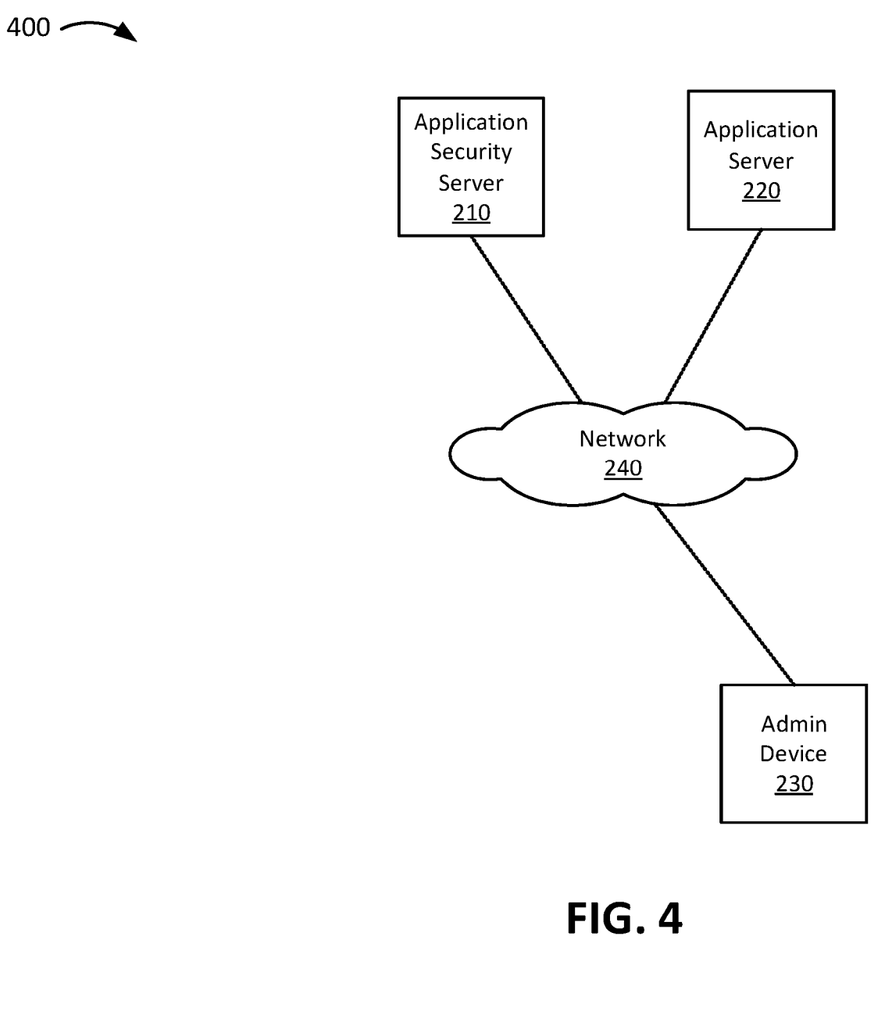
FIG. 4 shows an example environment in accordance with aspects of the present invention.

FIG. 4 shows an example environment in accordance with aspects of the present invention. As shown in FIG. 4, environment 400 may include the application security server 210, the application server 220, an admin device 230, and a network 240. In embodiments, one or more components in environment 400 may include one or more components in the computing environment of FIG. 1.

The application security server 210 may include one or more computing devices that identifies whether the application server 220 is hosting webpages or applications that are accessible by unauthorized users. For example, as described above, the application security server 210 may include one or more program modules (e.g., program modules 42 of FIG. 1) that are configured to store privileged outputs; access privileged URLs using non-privileged credentials; compare non-privileged outputs with privileged outputs; and output alerts when the privileged outputs and the non-privileged outputs match.

The application server 220 may include one or more computing devices that host a web-based application or series of webpages. As described above, the application server 220 provides access to the web-based application or website via user credentials. The application server 220 may present different root pages to different users based on the received user credentials. Different root pages associated with different users may present URLs to different pages based on the pages that different users are permitted to access.

The admin device 230 may include one or more computing devices associated with a site administrator of the application server 220. The admin device 230 may receive alerts identifying webpages that are accessible via non-privileged credentials and/or non-privileged session. Based on receiving the alerts, the admin device 230 may implement policies or modifications to prevent application server 220 from providing webpages to unauthorized users.

The network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
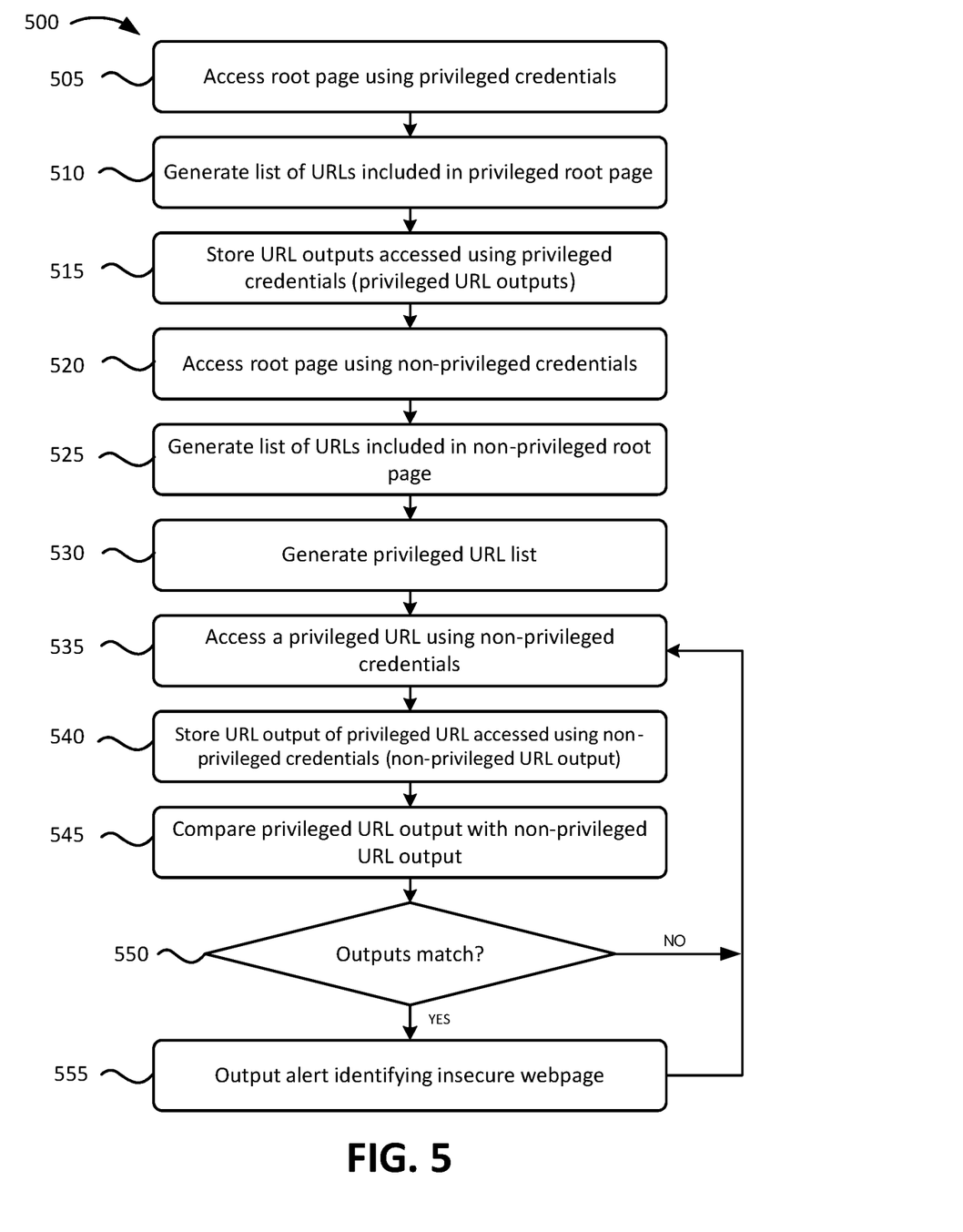
FIG. 5 shows an example flowchart for generating a privileged URL list in accordance with aspects of the present invention.

FIG. 5 shows a flowchart of an example process 500 for generating a privileged URL list in accordance with aspects of the present invention. The steps of FIG. 5 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 5, process 500 may include accessing a root page using privileged credentials (step 505). For example, the application security server 210 may access a root page associated with a particular website or application via the application server 220. In embodiments, the application security server 210 may access the root page by providing the application server 220 with privileged credentials at a login screen or homepage associated with the website or application hosted by the application server 220.

Process 500 may further include generating a list of URLs included in the "privileged" root page (step 510). For example, the application security server 210 may identify the URLs included or presented in the privileged root page based on, for example, HyperText Markup Language (HTML) data received when accessing the privileged root page.

Process 500 may also include storing images of URL outputs accessed using the privileged credentials (step 515). For example, the application security server 210 may "crawl" or access each of the webpages mapped to the URLs. The output of a webpage request using a URL (e.g., the privileged URL output) may then be stored by the application security server 210. In embodiments, the URL output may be stored in the form of an image (e.g., an image file, such as a .jpg file, a .jpeg file, a .giff file, a .png file etc.). Additionally, or alternatively, the output may be stored in another form (e.g., HTML code, webpage frame data, webpage text, etc.). The application security server 210 may store the privileged URL outputs for each URL.

Process 500 may further include accessing the root page using non-privileged credentials (step 520). For example, the application security server 210 may access the root page of the same application or website as in step 505. However, at this stage, the application security server 210 may access the root page using non-privileged credentials (e.g., credentials that are different than the privileged credentials). As described above, the non-privileged credentials may be associated with a different user than the privileged credentials. The application security server 210 may access the root page using non-privileged credentials by submitting the non-privileged credentials via a form at a login screen. In alternative embodiments, the application security server 210 may access the root page using non-privileged credentials by selecting a link on the login page (e.g., a link for "guest access").

Process 500 may also include generating a list of URLs included in the "non-privileged" root page (step 525). For example, the application security server 210 may identify the URLs included or presented in the privileged root page based on, for example, HyperText Markup Language (HTML) data received when accessing the privileged root page.

Process 500 may further include generating a privileged URL list (step 530). For example, the application security server 210 may compare the URL list generated at step 510 with the URL list generated at step 525. Based on the two URL lists, the application security server 210 generates a "privileged" URL list that includes those URLs included in the privileged root page, but not included in the non-privileged root page. That is, privileged URL list identifies those URLs that should not be accessible to unauthorized users (e.g., users that attempt to access the URLs using a non-privileged ID).

Process 500 may also include accessing a privileged URL (e.g., a URL in the privileged URL list) using non-privileged credentials (step 535). For example, the application security server 210 may browse to a particular URL in the privileged URL list while logged in with non-privileged credentials (e.g., while logged in as a guest user or as a different user than a user of the privileged credentials). That is, the application security server 210 may browse to a particular URL in the privileged URL list while a non-privileged session is established between the application security server 210 and the application server 220.

Process 500 may further include storing a URL output of the privileged URL accessed using the non-privileged credentials (step 540). For example, the application security server 210 may store the output of a webpage requested using the privileged URL (e.g., a non-privileged URL output) that was accessed using non-privileged credentials. In embodiments, the URL output may be stored in the form of an image (e.g., an image file, such as a .jpg file, a .jpeg file, a .giff file, a .png file etc.). Additionally, or alternatively, the output may be stored in another form (e.g., HTML code, webpage frame data, webpage text, etc.).

Process 500 may also include comparing the privileged URL output with the non-privileged URL output (step 545). For example, the application security server 210 may compare the privileged URL output (generated at step 515) with the non-privileged URL output (generated at step 540). In embodiments, the application security server 210 may compare the URL outputs using image comparison techniques (e.g., pixel-based classification techniques). The application security server 210 may additionally, or alternatively, compare the URL outputs by comparing HTML code associated with the two outputs. Additionally, or alternatively, the application security server 210 may compare text, formatting, metadata, and/or other data associated with the two outputs.

Process 500 may further include determining whether the outputs match (step 550). For example, the application security server 210 may determine whether the outputs match based on comparing the privileged URL output with the non-privileged URL output as described above. In embodiments, the outputs would not match if the accessing the privileged URL using the non-privileged credentials returns a webpage that is different than the webpage returned when the privileged URL is accessed using the privileged credentials (e.g., if the webpage returned when accessed using non-privileged credentials is a redirected webpage, a webpage with an error message, an "access denied" message, etc.).

If the outputs do not match (step 550—NO), the application security server 210 determines that the webpage of the privileged URL is not accessible via non-privileged credentials, and process 500 may return to step 535 to access the next privileged URL in the privileged URL list using non-privileged credentials, store the non-privileged output, and compare the privileged output of the URL with the non-privileged output.

If, on the other hand, the outputs match (step 550—YES), the application security server 210 may output an alert identifying that the webpage (e.g., associated with the privileged URL) is insecure (step 555). In embodiments, the application security server 210 may generate a report identifying privileged URLs that were and were not accessible using the non-privileged credentials. In embodiments, the application security server 210 may output the alert to an admin device 230 associated with a site administrator of the application server 220. As described above, the alert or report may be used to identify insecure webpages so that appropriate actions may be taken to secure the webpages (e.g., adding re-direct or access blocking protocols to the insecure pages).

In embodiments, the steps of process 500 may be in a different order than what is shown in FIG. 5. For example, in alternative embodiments, step 515 may not occur until after the privileged URL list is generated in step 530. Further the application security server 210 may only store URL outputs of privileged URLs instead of URL outputs of all URLs listed on a privileged root page.

Figure 6:
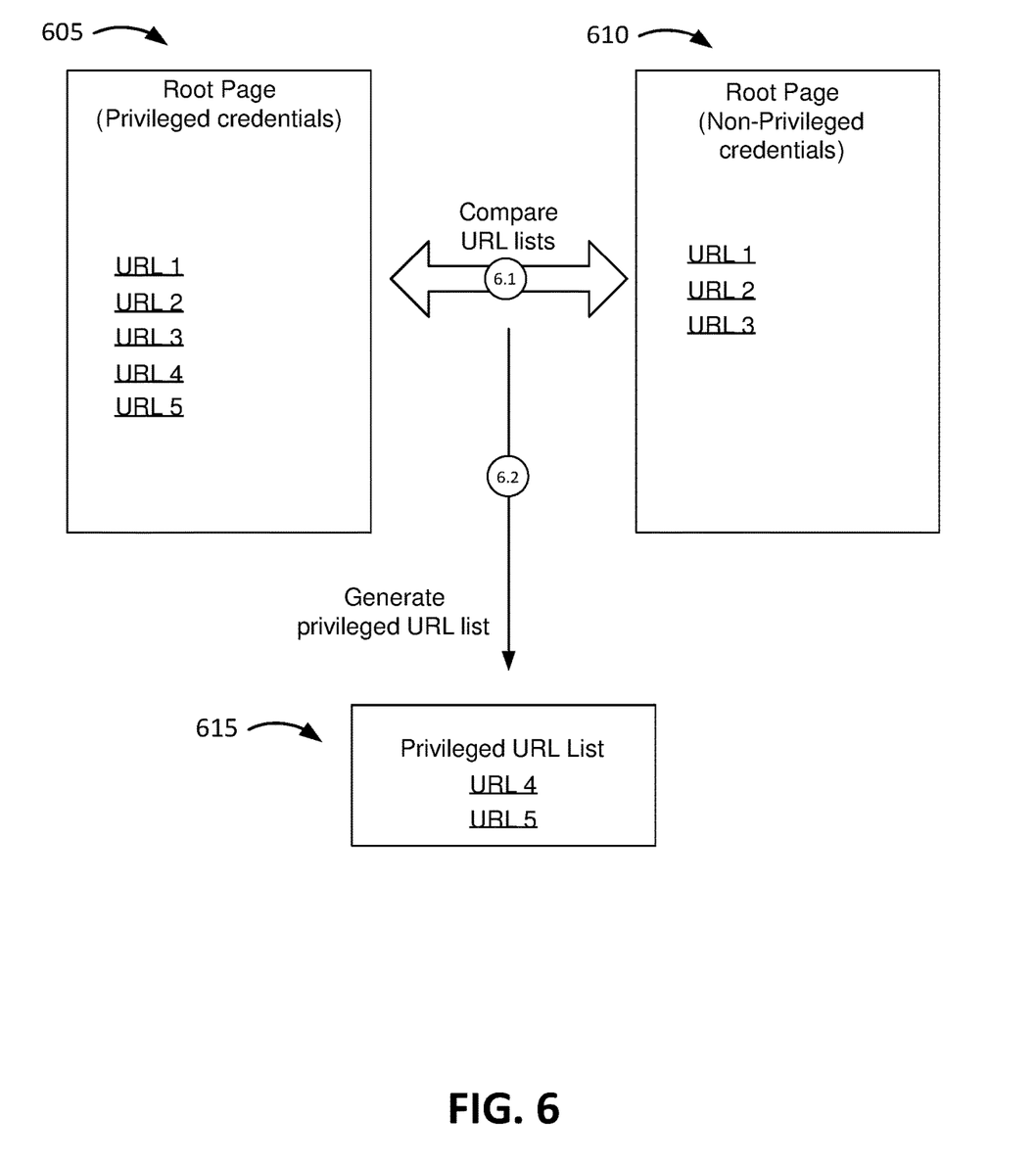
FIG. 6 shows an example implementation for generating a privileged URL list in accordance with aspects of the present invention.

FIG. 6 shows an example implementation for generating a privileged URL list in accordance with aspects of the present invention. As shown in FIG. 6, a root page 605 presents a first list of URLs (e.g., URLs 1 through 5) when accessed with privileged credentials. A root page 610 presents a second list of URLs when accessed with non-privileged credentials (e.g., URLs 1 through 3). At step 6.1, the application security server 210 compares the two lists, and generates a privileged URL list 615 (at step 6.2). As shown in FIG. 6, the privileged URL list 615 includes URLs 4 and 5, since URLs 4 and 5 are present in the root page 605 of the privileged credentials, but not in the root page 610 of the non-privileged credentials.

Figure 7:
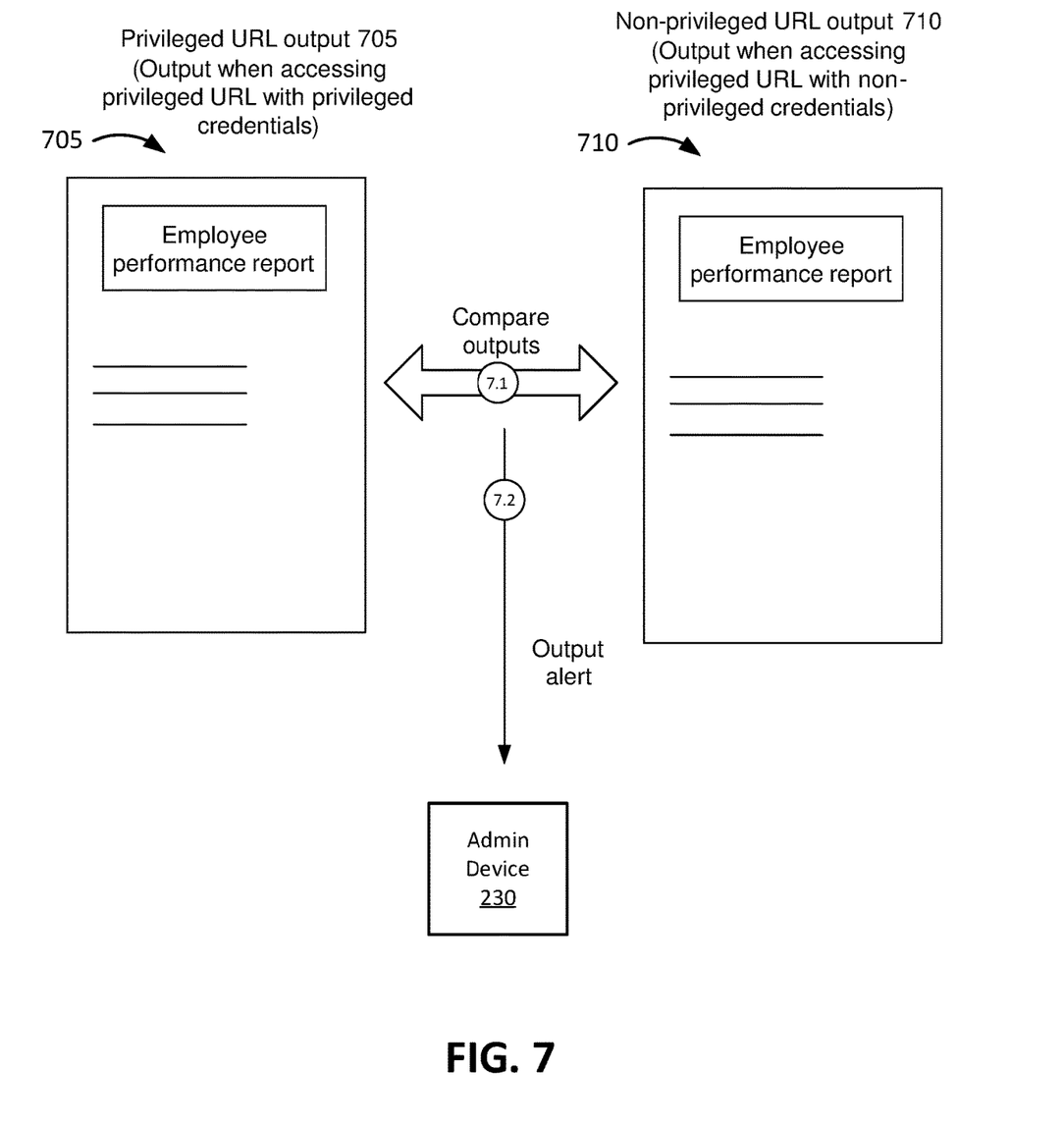
FIGS. 7 and 8 show example implementations for identifying insecure webpages in accordance with aspects of the present invention
Figure 8:
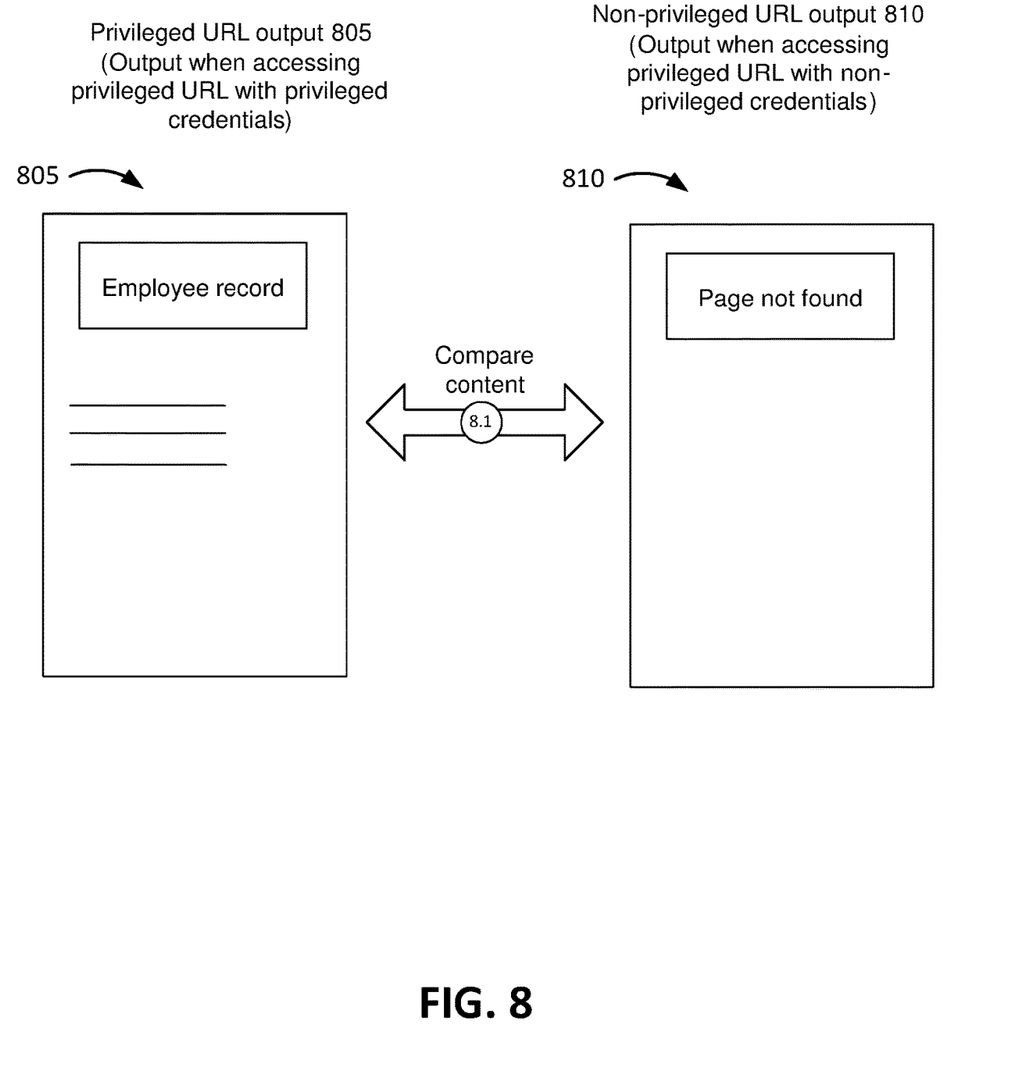

FIGS. 7 and 8 show example implementations for identifying insecure webpages in accordance with aspects of the present invention. Referring to FIG. 7, at step 7.1, a privileged URL output 705 (e.g., the output when accessing the privileged URL with privileged credentials) is compared with a non-privileged URL output 710 (e.g., the output when accessing the privileged URL with non-privileged credentials). In the example shown in FIG. 7, the outputs match, and thus, an alert is outputted (at step 7.2) to an admin device (e.g., admin device 230 of FIG. 4).

Referring to FIG. 8, at step 8.1, a privileged URL output 805 is compared with a non-privileged URL output 810. In the example shown in FIG. 8, the outputs do not match, and thus, an alert is not outputted. In embodiments, the application security server (e.g., application security server 210 of FIG. 4) may store information indicating that the privileged URL is secure since the webpage mapped to the URL was not accessible with non-privileged credentials.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:

generate a first list of uniform resource locators (URLs) available on a root page when accessing the root page using privileged credentials;

access, using the privileged credentials, respective webpages mapped to each URL in the first list of URLs;

generate a second list of URLs available on the root page when accessing the root page using non-privileged credentials;

generate a third list of URLs based on the first list of URLs and the second list of URLs, wherein the third list of URLs includes URLs included in the first list of URLs and not included in the second list of URLs;

access, using the non-privileged credentials, a webpage mapped to a particular URL in the third list of URLs;

determine that content of the webpage mapped to the particular URL in the third list of URLs matches content of a webpage mapped to a first URL in the first list of URLs; and output an alert based on the determination that the content of the webpage mapped to the particular URL in the third list of URLs matches the content of the webpage mapped to the first URL in the first list of URLs.

2. The computer program product of claim 1, wherein generating the third list of URLs includes generating the third list of URLs by comparing the URLs in the first list of URLs with the URLs in the second list of URLs and eliminating the URLs in the first list of URLs that are in the second list of URLs.

3. The computer program product of claim 1, wherein the determining includes comparing the content of the webpage mapped to the particular URL in the third list of URLs to the content of the webpage mapped to the first URL in the first list of URLs.

4. The computer program product of claim 3, wherein the comparing includes at least one selected from the group consisting of:
   comparing images associated with the content of the webpage mapped to the first URL in the first list of URLs and images associated with the content of the webpage mapped to the particular URL in the third list of URLs;
   comparing code associated with the content of the webpage mapped to the first URL in the first list of URLs and code associated with the content of the webpage mapped to the particular URL in the third list of URLs; and
   comparing text associated with the content of the webpage mapped to the first URL in the first list of URLs and text associated with the content of the webpage mapped to the particular URL in the third list of URLs.

5. The computer program product of claim 1, wherein alert indicates that the webpage mapped to the first URL in the first list of URLs is accessible by an unauthorized user based on the determining.

6. The computer program product of claim 5, wherein the alert includes a report identifying a plurality of webpages accessible by unauthorized users, and the report further identifies webpages inaccessible by unauthorized users.

7. The computer program product of claim 1, wherein accessing the root page with the privileged credentials or the non-privileged credentials includes submitting the privileged credentials or non-privileged credentials in a form on a login page associated with the root page.

8. The computer program product of claim 1, wherein the privileged credentials are different than the non-privileged credentials.

9. The computer program product of claim 1, wherein accessing the root page with the non-privileged credentials includes selecting a link to the root page without submitting data in a form.

10. The computer program product of claim 1, wherein the root page is associated with an application or website.

11. The computer program product of claim 1, wherein the program instructions further cause the computing device to store the content of the webpage mapped to the particular URL in the third list of URLs and the content of the webpage mapped to the first URL in the first list of URLs.

12. A system comprising:
   a CPU, a computer readable memory and a computer readable storage medium associated with a computing device;
   program instructions to receive a first root page of a website including a list of privileged uniform resource locators (URLs) wherein the list of privileged URLs are URLs that are included in a first list of URLs that are available on the first root page of the website when accessing the first root page of the website using privileged credentials, and are not included in a second list of URLs that are available on a second root page of the website when accessing the second root page using non-privileged credentials;
   program instructions to access a webpage mapped to a particular URL in the list of privileged URLs using privileged credentials;
   program instructions to access the webpage mapped to the particular URL in the list of privileged URLs using non-privileged credentials;
   program instructions to determine that first content of the webpage accessed using the non-privileged credentials matches second content of the webpage accessed using the privileged credentials; and
   program instructions to output an alert based on the determination that the first content of the webpage accessed using the non-privileged credentials matches second content of the webpage accessed using the privileged credentials,
   wherein the program instructions are stored on the computer readable storage medium for execution by the CPU via the computer readable memory.

13. The system of claim 12, wherein the URLs in the list of privileged URLs are mapped to webpages having confidential content associated with an authorized user.

14. The system of claim 12, wherein the determining comprises comparing the first content with the second content.

15. The system of claim 14, wherein the comparing the first content with the second content includes at least one selected from the group consisting of:
   comparing images associated with the first content and images associated with the second content;
   comparing code associated with the first content and code associated with the second content; and
   comparing text associated with the first content and text associated with the second content.

16. A computer-implemented method comprising:
   accessing, by a computing device, a root page associated with an application or website using privileged credentials;
   generating, by the computing device, a first list of uniform resource locators (URLs) available on the root page when accessing the root page using the privileged credentials;
   accessing, by the computing device, the root page using non-privileged credentials;
   generating, by the computing device, a second list of URLs available on the root page when accessing the root page using the non-privileged credentials;
   generating, by the computing device, a third list of URLs based on the first list of URLs and the second list of URLs, wherein the third list of URLs includes URLs included in the first list of URLs and not included in the second list of URLs;
   accessing, by the computing device, a webpage mapped to a particular URL in the third list of URLs using the privileged credentials;
   accessing, by the computing device, a webpage mapped to the particular URL in the third list of URLs using the non-privileged credentials;
   determining, by the computing device, that first content of the webpage accessed using the non-privileged credentials matches second content of the webpage accessed using the privileged credentials; and
   outputting, by the computing device, an alert based on the determining that the first content of the webpage accessed using the non-privileged credentials matches the second content of the webpage accessed using the privileged credentials.

17. The method of claim 16, wherein the URLs in the third list of URLs are mapped to webpages having confidential content associated with an authorized user.

18. The method of claim 16, wherein the privileged credentials are different than the non-privileged credentials.

19. The method of claim 16, wherein a service provider at least one of creates, maintains, deploys and supports the computing device.

20. The method of claim 16, wherein the accessing the root page using the privileged credentials, the generating the first list of URLs, the accessing the root page using non-privileged credentials, the generating the second list of URLs, the generating the third list of URLs, the accessing the webpage mapped to a particular URL in the third list of URLs, the accessing the webpage mapped to the particular URL, the accessing the webpage mapped to the particular URL in the third list of URLs, and the determining are provided by a service provider on a subscription, advertising, and/or fee basis.

21. The method of claim 16, further comprising:
deploying a system for identifying webpages that are accessible by unauthorized users, the deploying comprising:
providing a computer infrastructure operable to perform the accessing the root page using the privileged credentials, the generating the first list of URLs, the accessing the root page using non-privileged credentials, the generating the second list of URLs, the generating the third list of URLs, the accessing the webpage mapped to a particular URL in the third list of URLs, the accessing the webpage mapped to the particular URL in the third list of URLs, and the determining that first content of the webpage accessed using the non-privileged credentials matches second content of the webpage accessed using the privileged credentials.

22. A computer program product comprising a computer readable storage medium having program instructions embodied therewith, the program instructions executable by a computing device to cause the computing device to:
receive a list of privileged uniform resource locators (URLs) wherein the list of privileged URLs are URLs that are included in a first list of URLs that are available on a root page when accessing the root page using privileged credentials, and are not included in a second list of URLs that are available on the root page when accessing the root page using non-privileged credentials;
determine a first content in response to the receiving the list of privileged URLs and accessing a privileged URL in the list of privileged URLs using the privileged credentials, wherein the first content includes an image of a webpage when the privileged URL in the list of privileged URLs is accessed using privileged credentials;
determine a second content in response to the receiving the list of privileged URLs and accessing the privileged URL in the list of privileged URLs using non-privileged credentials, wherein the second content includes an image of the webpage when the privileged URL is accessed using the non-privileged credentials;
determine that the second content matches the first content utilizing image comparison techniques;
output an alert based on the determining that the second content matches the first content.

\* \* \* \* \*